United States Patent [19]
Butterfield et al.

[11] 3,880,005
[45] Apr. 29, 1975

[54] FLUID LEVEL SIGHT GAGE FOR DYNAMOELECTRIC MACHINE MOUNTED WITHIN THE MACHINE FRAME

[75] Inventors: John Leonard Butterfield; James Lawrence Wenzel, both of Erie, Pa.

[73] Assignee: General Electric Company, Wilmington, Mass.

[22] Filed: Nov. 12, 1973

[21] Appl. No.: 414,982

[52] U.S. Cl. .............................. 73/334; 116/118 R
[51] Int. Cl. .............................................. G01f 23/02
[58] Field of Search ............. 73/334, 323, 325, 326, 73/327, 328, 330; 116/117 C, 117 R, 118 R; 220/82 R

[56] References Cited
UNITED STATES PATENTS

| | | | |
|---|---|---|---|
| 2,331,917 | 10/1943 | Kocher | 73/334 |
| 2,461,989 | 2/1949 | LeRoy | 220/82 R |
| 2,765,661 | 10/1956 | Thomas | 73/334 |
| 3,373,610 | 3/1968 | Stieber | 73/334 |
| 3,417,730 | 12/1968 | Colley et al. | 73/323 X |

FOREIGN PATENTS OR APPLICATIONS

| | | | |
|---|---|---|---|
| 893,502 | 4/1962 | United Kingdom | 73/334 |

*Primary Examiner*—Richard C. Queisser
*Assistant Examiner*—Joseph W. Roskos

[57] ABSTRACT

The invention relates to a recessed sight gage for providing a visual indication of the oil level with a dynamoelectric machine. The sight gage is mounted in a recessed slot in the frame of the machine. A flat, heat resistance sight glass surrounded by a radial compression member for edge mounting the glass is supported in the recessed slot. This recess is smaller than the glass and the compression member so that the glass held in place by radial compression thereby avoiding bending stresses on the face of the sight glass which might cause it to fracture at high temperature and high vibration.

5 Claims, 3 Drawing Figures

PATENTED APR 29 1975 3,880,005

FLUID LEVEL SIGHT GAGE FOR DYNAMOELECTRIC MACHINE MOUNTED WITHIN THE MACHINE FRAME

The instant invention relates to a device for providing a visual indication of the oil level inside of a machine frame and more particularly, to an oilsight gage for a dynamoelectric machine.

Sight gages for determining the level of a fluid within a container, tank, or any enclosed device are well-known and utilized with various equipments such as boilers, tanks and even the mundane coffee pot. In most of these applications, the sight gage is attached to the outer wall of the container and liquid flows from the interior to a transparent sight glass or tube where it rises to the same level as the liquid within the container. In most circumstances, mounting the sight gage on the exterior of the device is perfectly acceptable since mounting space is no problem. Furthermore, in most instances, the operational environment of the gage in terms of temperature and vibration are such that no severe stresses are placed on the components of the sight gage and hence, simple exterior face mounting of the gage or transparent member is eminently satisfactory and acceptable. In aircraft applications, however, and particularly in connection with dynamoelectric machines such as aircraft generators, for example, the operational environment is such as to place severe restraints and limitations on the nature, characteristics, and configuration of the sight gage. Thus, in aircraft applications, space is usually at a premium so that simply mounting a sight gage exterior of the frame or housing of a generator is a highly undesirable practice since space is often simply not available. In addition, devices in aircraft use are subject to high temperature operation, in the range of 100° to 150°C, and are subject to severe vibration and this raises many operational problems.

Thus, typically in commercially available sight gages, the gage consists of a transparent plastic sight element, a resilient gasket and a metallic frame or clamping member. The plastic sight element gasket and clamping members are fastened firmly to the side of the frame or housing of an aircraft dynamoelectric machine and the generally cylindrical sight element communicates with the interior of the frame so that the oil level in the machine is visible. However, this type of device requires extra space being mounted on the exterior of the generator and furthermore, has been found subject to a number of other shortcomings. These other shortcomings involve either the use of a plastic sight glass or the means for mounting the sight. Aircraft oil cooled dynamoelectric machines use aircraft turbine oils which are usually synthetic diester oils which are very active chemically and attack many molded thermoplastics. Hence, the use of a plastic sight glass in an aircraft dynamoelectric machine at the high temperatures found there and with a very chemically active oil often results in the sight glass fracturing or crazing the use. If glass is substituted in place of the plastic in order to avoid the problems associated with temperature and the chemically active oil, it has been found that mounting the device in the manner described, i.e., so that the glass is face mounted, and the clamp or frame member exerts pressure on the face of the glass to seal and hold it, often results in fracturing of the glass due to the bending stresses on the face of the glass since glass does not resist bending stresses very well. That is, in order to seal the sight glass against oil leakage, pressure is exerted against the gasket and the glass to minimize leakage of the oil and hold the glass in place. Since the machine is operated under high vibration and high temperatures, flexing of the machine frame due to temperature and vibration causes the application of bending stresses to the face of the glass and often resulted in cracking of the glass and leakage of the oil from the machine.

Thus, the prior art sight gages available for use in aircraft dynamoelectric machines always present a designer with a dilemma in that the type of gages which withstand the bending stresses generated on the frame by the temperature and vibration characteristics, namely plastics of various sorts, are susceptible to crazing or cracking due to the action of the temperature and the chemically active oil. If, on the other hand, glass sight elements which resist the oil and the temperature stresses are utilized, the customary means of mounting the glass to the exterior of the frame result in the application of serious bending stresses on the glass due to bending and of the supporting frame often resulting in cracking of the sight glass.

Applicant has found a novel sight gage structure and mounting arrangement which avoids face mounting of the sight glass, thereby eliminating bending stresses, by edge mounting the sight glass under radial compression. Furthermore, the novel radial mounting arrangement allows the entire sigght gage assembly to be positioned within an opening in the housing or frame so that the entire assembly is either flush with or below the surface of the dynamoelectric machine housing. This eliminates need for additional space for the sight gage, a factor of extreme importance in aircraft applications where space is at a premium.

It is therefore a primary objective of the instant invention to provide a fluid sight gage which does not project beyond the surface of the fluid containing housing.

Another objective of the invention is to provide a sight gage in which the sighting element is edge mounted thereby avoiding the imposition of bending pressures on the sighting element.

A further objective of the invention is to provide a sight gage for a dynamoelectric machine for aircraft applications which does not utilize extra space for mounting the sight gage.

Yet another objective of the invention is to provide a sight gage for an oil cooled dynamoelectric machine mounted within the machine housing and which is oil tight.

Still another objective of the invention is to provide a sight gage for an oil cooled dynamoelectric machine for aircraft applications which is mounted within the housing of the dynamoelectric machine and which will withstand the severe environmental conditions found in aircraft applications.

A yet further objective of the invention is to provide an oil sight gage for an oil cooled aircraft generator which is simple in construction, utilizes a minimum of space, is easy to manufacture, and is effective and reliable in operation.

Other objectives and advantages of the invention will become apparent as the description thereof proceeds.

The various advantages and objectives of the instant invention are realized in a sight gage for an aircraft dynamoelectric machine in which the sight gage is mounted in the housing of the machine in such a manner that it is flush with the surface of the housing and thus, does not utilize any excess space. The sight gage is mounted in an opening machined or cast in the frame of the housing and this opening includes a recessed portion for mounting the sight gage and a central passage from the recessed portion into the interior of the housing where it communicates with the oil sump of the machine. The transparent sighting element which takes the form of a flat, heat resistant glass is mounted by means of an elastomer ring, positioned around the periphery of the sight glass within the recessed portion in the housing. The dimension of the glass and the elastomer ring are such that they exceed the dimensions of the recess so that the glass and ring are mounted by compressing the ring. This results in a sealing action for the glass to prevent escape of the oil and also in applying radial compressional pressure along the edge of the glass thereby avoiding any pressure on the face of the glass and hence, any bending stresses. Positioned behind the glass and in the central passage is a metallic semicylindrical member which has an opening to the central passage and which, together with the glass, forms a chamber into which the oil flows to provide a visual indication of the oil level within the machine itself. Thus, a sight gage is provided which is flush with the surface of the dynamoelectric housing and which gives a rapid and accurate indication of the oil level within the housing.

Other features which are characteristic of this invention are set forth in detail in the appended claims. The invention itself, however, together with other objects and advantages thereof, will best be understood by reference to the following description taken in conjunction with the accompanying drawings in which:

Figures 1, 2, 3:
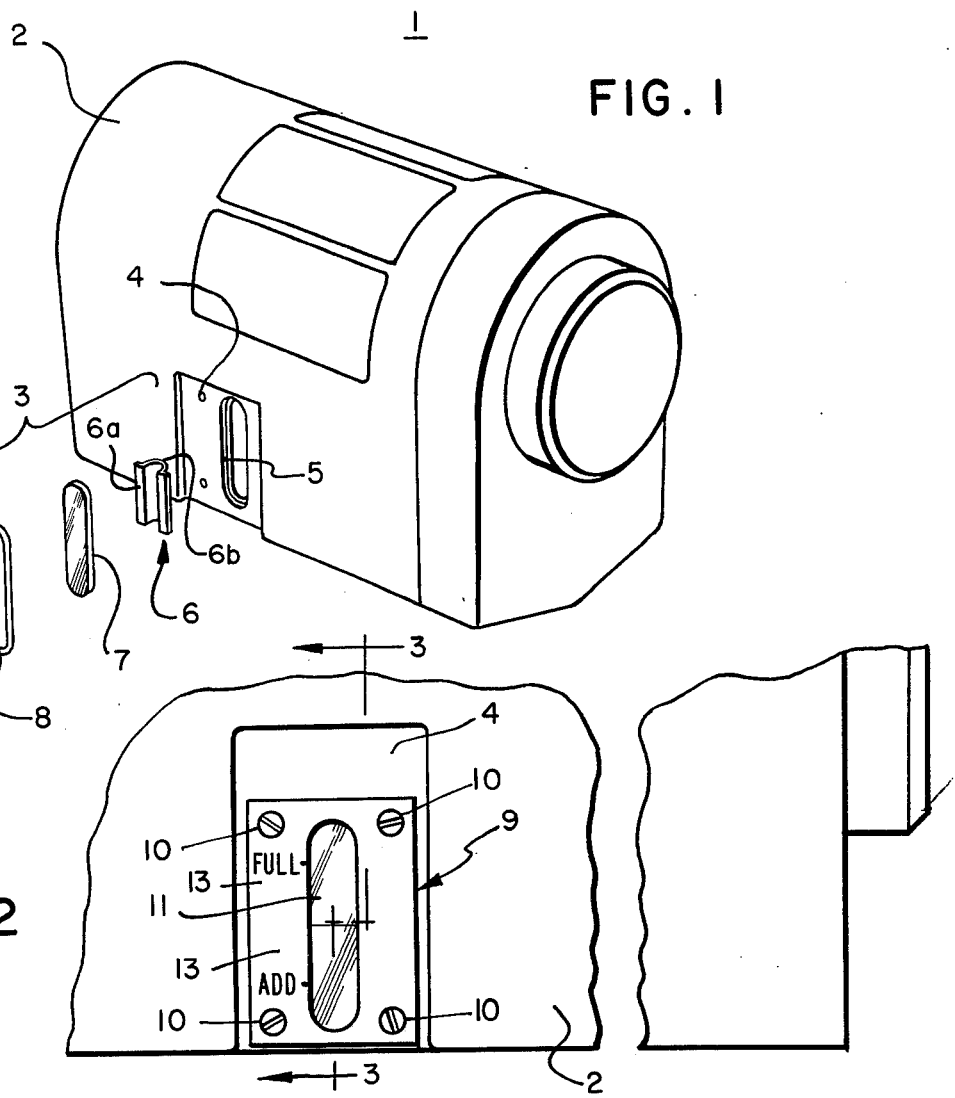
FIG. 1 is an exploded perspective of the sight gage of the instant invention shown associated with a dynamoelectric machine.
FIG. 2 is a front view of the assembled sight gage of the invention.
FIG. 3 is a sectional view of the sight gage taken along the lines 3-3 of FIG. 2.

FIG. 1 shows a perspective view of a dynamoelectric machine 1, which may, for example, be an oil cooled aircraft generator which includes a permanent magnet generator, a brushless exciter, and a synchronous generator mounted in a housing or frame 2. The oil sight gage of the instant invention is shown in exploded form generally at 3 and is mounted in the frame so as to be flush with or below the surface of generator housing 2 to provide thereby an accurate indication of the oil level within the machine. Housing 2 of the dynamoelectric machine contains a retaining slot 4 machined or cast in the housing for receiving the sight gage presently to be described. A recess or pocket 5 in the retaining slot supports the gage and also communicates with the interior of the machine to permit oil to flow from the sump of the machine to the sight gage to give a visual indication of the level of oil in the machine.

Sight gage 3 includes a semicylindrical strip 6 having a pair of flanges 6a and a cylindrical body 6b, an elongated heat resistant, flat sight glass 7, a resilient, elastomer ring 8 which acts as an oil seal and as a radial compression member to hold the flat sight glass firmly in place, and a slotted cover 9 which fits over the surface of the sight glass and is secured to opening 4 by a plurality of screws 10. An opening or display slot 11 in cover 9 exposes the sight glass and provides a view of the oil level in the machine sump.

In the assembled state, as may be seen most clearly in the front view shown in FIG. 2, the cover plate 9 is secured in slot 4 of the housing by means of the screws 10. The opening 11 in the cover plate exposes the sight glass 7 which is mounted in a recess in slot 4 to show the level of the oil in the machine housing. Cover 9 also contains a pair of markings or indices 13 to indicate whether the oil level is below a critical oil level at which, oil must be added or whether it is at the full level shown by the mark.

As may be seen in the sectional view of FIG. 3, the sight glass assembly is positioned within the slot 4, is mounted below the surface of the generator housing. Sight glass 7 and resilient elastomer O-ring 8 are mounted in the recess 5 which communicates through a central passage 15 with the interior or sump 16 of the machine. A ledge or shelf 17 is formed between the side wall of recess 5 and passage 15 and sight glass 7 and ring 8 are seated on this shelf. Recess 5 is smaller than the combined size of the glass and elastomer ring so that in assembling the sight glass within the recess, elastomer ring 8 is compressed to form a seal which prevents leakage of oil, while at the same time, exerting radial compression on the edges of the glass to maintain the glass firmly seated on the shelf and within the recess. In this fashion, the sight glass is positively retained within the recess, while at the same time, avoiding face mounting of the glass and the bending stresses associated therewith.

The depth of recess 5 is greater than the thickness of the glass and the ring so that a clearance 18 exists between sight glass 7 and the cover 9 to ensure that cover 9 does not exert compressional forces against the face of the glass. By virtue of this arrangement, flexing of the frame and cover in response to vibration and temperature has no deleterious effect on sight glass 7. Thus, it may be seen that the sight glass is held in place by virtue of the radial compression exerted against the edge of the glass by the elastomer O-ring 8. Since the glass is much more resistant to compressional forces along its edges that it is along its face, the arrangement shown in the instant invention not only seats the glass firmly and positively in place, but at the same time, avoids the bending stresses which are likely to crack the glass.

Semicylindrical strip 6a is supported on the shelf 17 beneath glass 7 by the flange members 6a which extend laterally across central passage 15. The semicylindrical portion 6b, on the other hand, extends into the central opening 15 forming a chamber 19 between the cylinder and sight glass 7. The chamber forming strip 6 is shorter than the central passage so that an opening 20 is formed between the bottom of the strip and the central passage permitting oil to flow into chamber 19 to the level 21 of the oil in the sump of the generator. The back wall of cylinder 6b may be painted white or otherwise have a surface coloration which provides good contrast between the oil color and the wall.

The sight glass utilized in the gage of the instant invention is, as has been pointed out previously, preferably an elongated glass having rounded ends and is formed of a heat resistant glass of the type sold under the trade designation "Pyrex." The resilient elastomer O-ring which fits around the sight glass and provides both the oil sealing as well as the radial compression force to retain the glass in the recess is preferably a fluorocarbon elastomer of the type sold by the E.I. duPont de Nemours Co. of Wilmington, Del. under its trade designation "Viton." Viton is a copolymer of hexafluoropropylene and vynilidene fluoride. Fluorocarbon elastomers of this type are characterized by good resistance to synthetic diester oils which are very active chemically and will attack many compositions. Furthermore, the material is easily compressible and resilient to thereby apply firm pressure to the glass when in the mounted position.

It can be seen from the previous description that a sight gage has been described which is small in size, does not extend beyond the surface of the container, is so mounted that bending stresses are not applied to the surface of the sight glass thereby minimizing the risk of cracking the glass under severe environmental temperature and vibrational conditions, while at the same time, providing a firm seal against leakage and firm retention of the sight glass in its location.

While this invention has been described with particular reference to a sight gage instrumentality of a particular configuration, it will be obvious that many modifications may be made in the structures employed. It is contemplated by the appended claims to cover any such modifications which fall within the true spirit and scope of this invention.

What is claimed as new and desired to be secured by Letters Patent of the United States is:

1. In an oil level sight gage for a dynamoelectric machine, the combination comprising,
   a. a dynamoelectric machine having an oil containing housing and means in said housing for mounting a sight gage so that the sight gage does not extend beyond the housing including,
      1. a slot in said housing,
      2. a recessed portion in said slot communication with the interior of said housing, said recessed portion defining a ledge for supporting a sight gage,
   b. a sight gage mounted in said slot and supported on said ledge, said sight gage including,
      1. a transparent sight glass for providing a visible indication of the oil level in the interior of said housing,
      2. a resilient edge mounting means for said glass comprising a radial member surrounding said sight glass, said radial member and said sight glass being larger than said recess whereby said member is compressed when mounted on said ledge defined by said recess thereby sealing said glass in said recess and applying radial pressure to the edge of said glass so that the sight glass is not subject to bending stresses as the housing flexes due to temperature and vibration.

2. The oil level sight gage according to claim 1 wherein said radial compression member consists of an elastomer ring stretched around the periphery of said glass.

3. The oil level sight gage according to claim 1 including means mounted behind said glass for defining an oil chamber.

4. The oil level sight gage according to claim 3 wherein said chamber defining means includes a semicylindrical portion open at both ends to permit oil to flow into said chamber and flange means for supporting said semicylinder in said recess.

5. The oil level sight gage according to claim 4 including a cover mounted in said slot and above said sight gage, said cover having an opening therein to permit viewing of said sight glass, said cover being mounted to provide clearance between said glass and said cover whereby said cover does not exert any compressional force on the surface of said sight glass.

* * * * *